J. C. CLIME.
Turbine Water-Wheel.

No. 213,624. Patented Mar. 25, 1879.

WITNESSES:
George Stevens
G. W. Weaver

INVENTOR.
John C. Cline

2 Sheets—Sheet 2.

J. C. CLIME.
Turbine Water-Wheel.

No. 213,624. Patented Mar. 25, 1879.

WITNESSES:
George Stevens
G. W. Weaver

INVENTOR.
John C. Clime

UNITED STATES PATENT OFFICE.

JOHN C. CLIME, OF PHILADELPHIA, PENNSYLVANIA, ASSIGNOR OF ONE-HALF HIS RIGHT TO GEORGE F. GODLEY, OF SAME PLACE.

IMPROVEMENT IN TURBINE WATER-WHEELS.

Specification forming part of Letters Patent No. 213,624, dated March 25, 1879; application filed April 13, 1878.

*To all whom it may concern:*

Be it known that I, JOHN C. CLIME, of Philadelphia, in the county of Philadelphia and State of Pennsylvania, have invented certain new and useful Improvements in Turbine Water-Wheels; and I do hereby declare the following to be a full, clear, and exact description of the invention, such as will enable others skilled in the art to which it pertains to make and use it, reference being had to the accompanying drawings, which form part of this specification, in which—

Figure 1:
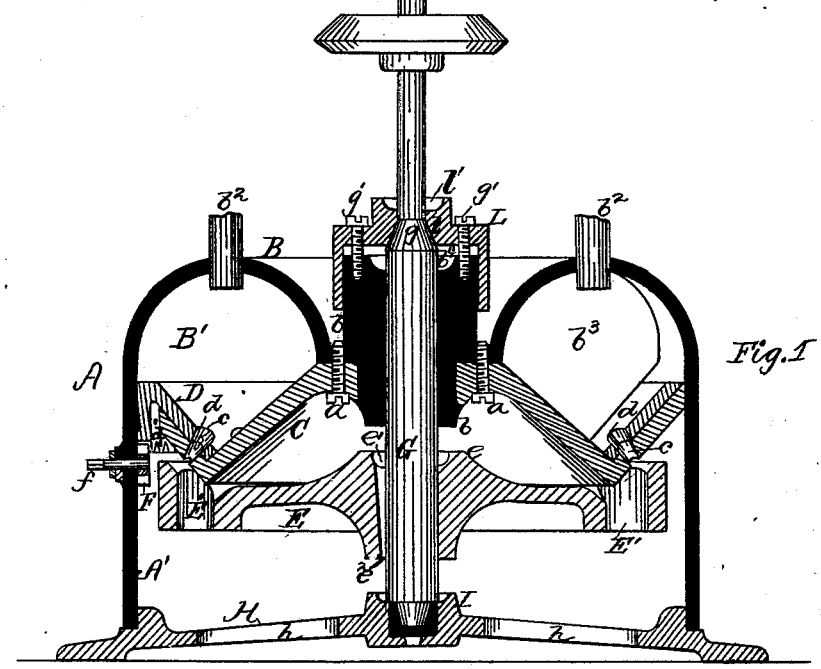
Figure 2:
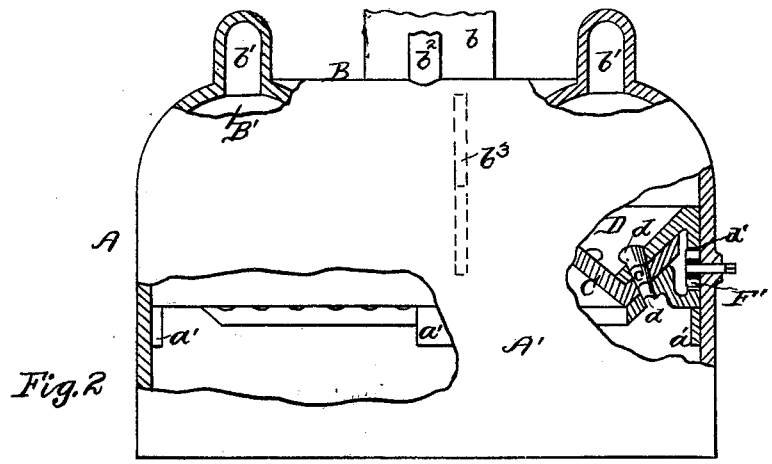
Figure 3:
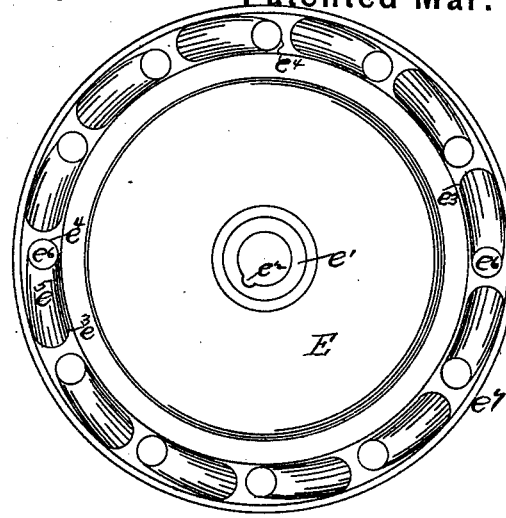
Figure 4:
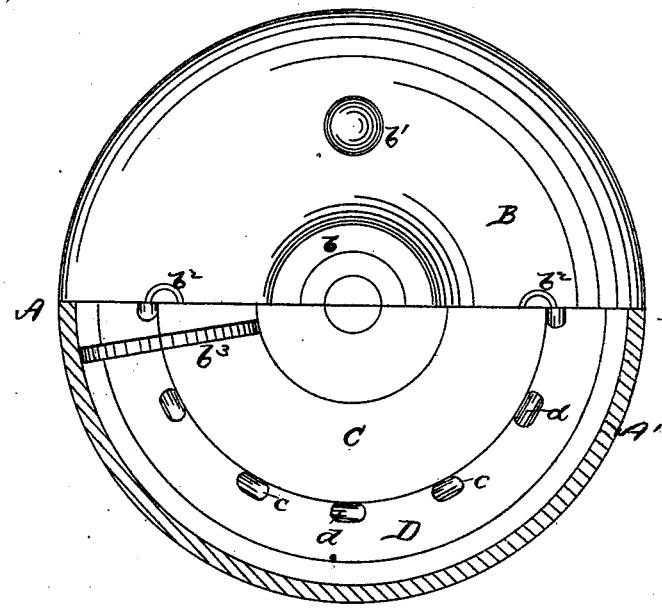

Figure 1 is a vertical longitudinal section of my invention. Fig. 2 is an elevation, partly in section, of the wheel-case and chute-ring. Fig. 3 is a plan of the wheel; and Fig. 4 is a plan of my improvements, partly in section.

The object of my invention is to provide an improved turbine water-wheel; and consists of the provision of a wheel-case having the sides and top thereof cast or formed in one piece, and provided with one or more air-chambers, a water-inlet, and a vertical depending fin or partition, said parts being so arranged as to cause the current of water to flow in one continuous direction to the chutes.

My invention further consists in the novel combination, construction, and arrangement of parts, as hereinafter more fully set forth.

Referring to the accompanying drawings, A designates the wheel-case, composed of the cylindrical part A' and top B, cast or formed in one piece. The latter is formed with a central hub or bearing, $b$, and is provided with an annular concave chamber, B', in the apex of which are one or more air-chambers, $b^1$, and water-inlets $b^2$, which extend downwardly into the chamber B' for a considerable distance, as shown.

Depending from the top of the chamber B' is a fin or partition, $b^3$, which is placed to the one side of one of the water-inlets $b^2$. Said partition extends down to the chute-ring C and gate D. The former is made V-shaped, and is bolted to the cover B, as shown at $a\ a$.

$c\ c$ are inclined chutes, passing through the ring C at intervals around the same. D is an annular gate, provided with inclined openings $d\ d$, which are caused to register with or vary from the chutes $c\ c$, so as to regulate the flow of water therethrough. Said gate, as shown in Fig. 1, is placed above the chute-ring C, and is supported and moves thereon, as shown.

$d'\ d'$ are teeth in said gate D, into which meshes a pinion, F, supported on the shaft $f$, which has its bearing in the sides of the case A, as shown. By turning the shaft $f$ the wheel F revolves and engages with the teeth $d'$ on the gate D, thereby causing the latter to move horizontally upon the chute-ring C. The openings $d\ d$ in said gate are thereby made to register with or vary from the chute-openings $c\ c$ in the ring C, and thus regulate and control the pressure and supply of water to the wheel.

If desired, the gate D may be placed below the chute-ring C, in which case it is supported and turns on ledges $a'\ a'$, secured to the case A; or, if desired, a gate both above and below the chute-ring may be used, as shown in Fig. 2. In the latter case both gates are adjusted by means of the pinion F', which is placed between said gates, as shown.

The wheel E is firmly secured to the shaft G. The latter has its lower bearing in the step I of the removable case-bottom H. Said shaft passes up through the hub $b$ and finds its bearing therein. The inner edge of the hub $b$ is cut away to form the oil-cup $b^4$, as is also the inner edge of the hub $e$ on the wheel E, thereby forming the oil-cup $e^1$, from which proceeds a groove, $e^2$, formed in said wheel, as shown. The wheel E is cast in one piece, with the buckets E' formed therein. The latter are of a peculiar shape, presenting the appearance of an irregular frustum of a cone, having their smaller diameters, $e^2$, and their larger diameters, $e^3$, respectively, in the lower and upper sides of said wheel. These diameters or openings are joined by the nearly vertical sides $e^4$ and greatly-inclined sides $e^5$, said buckets being inclosed by the wide rim $e^7$, which is made integral with said wheel and buckets, all of said parts being formed in the operation of casting, so that when the wheel E is cast nothing remains to be done but fit it to the shaft G. The latter, just as it passes out of the hub $b$, is reduced in diameter, and formed with an annular inclined face, $g$.

L is a cap, fitted upon said shaft, and adjustably secured to the hub $b$ by means of the set-screws $g'$ $g'$. Said cap is provided with a cone-shaped opening, $l$, corresponding in outline to the face $g$ on the shaft G, and is also formed with an oil-cup, $l'$. The opening $l$ of said cap, when the latter is secured in position upon the sleeve or hub $b$, bears against the inclined face $g$ on the shaft G, maintaining the latter in a vertical position, thereby causing the wheel E to revolve free of all wabbling and unsteadiness. To adjust the cap L to take up the wear on the bearings, the screws $g'$ $g'$ are further adjusted, drawing down the cap L until said bearings again accommodate themselves to each other. I can thus obtain an effective compensating journal-bearing.

Operation: The various parts being arranged as shown in Fig. 1, the flow of water is turned on, and passes through the inlets $b^2$ $b^2$ into the chamber B', and thence to and through the chutes $c$ $c$, the depending partition $b^3$ preventing the two currents from interrupting each other, and also from flowing in opposite directions. As the water enters the inlets and passes into the chamber B', the air therein is crowded into and held in the chambers $b^2$ $b^2$. Unless some provision is made for the reception of this air the water will not pass through the chutes when the wheel is desired to be operated by a low pressure of water. As the latter emerges from the chutes it strikes against the straight sides $e^4$ of the buckets E' E', imparting motion to the wheel, and then passes out from the case A through the openings $h$ $h$ in the bottom H.

To oil the step I and other bearings of the shaft G, oil is first poured into the cup $l'$, from which it flows down to the cup $b^4$, and thence to the cup $e^1$, and then through the groove $e^2$ to the step I. By this construction of the oil-cups I am able to lubricate with oil all the bearing-surfaces of the shaft G.

Heretofore no oil has been used within the wheel for lubricating purposes, the water passing through the wheel being relied upon to keep the bearings cool and prevent wear.

The casting of the case and its component parts integral with each other dispenses with all fitting of said parts together by expensive lathe-work. It also saves the use of packing to make tight joints, and reduces the cost of the wheel, while at the same time a more durable and more efficient turbine wheel is produced.

What I claim as my invention is—

1. The wheel-case A, having its sides and top formed integral with each other, the latter being provided with one or more water-inlets and one or more air-chambers, and a central bearing for the wheel-shaft, substantially as shown and described.

2. In combination with a shaft of a turbine water-wheel having inclined face $g$, the adjustable cap L, formed with a correspondingly-shaped aperture, said cap being secured to and adjustable on the exterior hub of the wheel-case A, substantially as shown and described, and for the purpose set forth.

3. A turbine water-wheel provided with oil-cups on its hubs and wheel-case, and a connection between them and the step of the wheel-shaft, whereby all the bearings of the same may be oiled from without and above the casing at one operation, substantially as shown and described.

4. The wheel-case A, provided with a depending partition, which extends down to the gate D or chute-ring C, as and for the purpose set forth.

In testimony that I claim the foregoing I have hereunto set my hand this 5th day of April, 1878.

JOHN C. CLIME.

Witnesses:
J. R. MASSEY,
FRANK H. MASSEY.